United States Patent
Vadlakonda et al.

(10) Patent No.: US 8,605,720 B2
(45) Date of Patent: *Dec. 10, 2013

(54) ANALYZING A NETWORK WITH A CACHE ADVANCE PROXY

(75) Inventors: Sravan Vadlakonda, Sunnyvale, CA (US); Rohini Kasturi, Livermore, CA (US); Alpesh S. Patel, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,750

(22) Filed: Sep. 11, 2012

(65) Prior Publication Data

US 2013/0003750 A1    Jan. 3, 2013

Related U.S. Application Data

(63) Continuation of application No. 11/771,246, filed on Jun. 29, 2007, now Pat. No. 8,295,277.

(51) Int. Cl.
*H04L 12/28* (2006.01)
(52) U.S. Cl.
USPC . 370/389; 370/395.41; 370/352; 370/395.52; 709/221; 709/222

(58) Field of Classification Search
USPC ........ 370/352, 395.41, 395.52, 389; 709/221, 709/222
See application file for complete search history.

(56) References Cited

U.S. PATENT DOCUMENTS

| | | | |
|---|---|---|---|
| 6,985,959 B1 * | 1/2006 | Lee | 709/238 |
| 7,051,109 B1 * | 5/2006 | Stewart et al. | 709/230 |
| 7,158,522 B1 * | 1/2007 | Singh et al. | 370/394 |
| 2003/0110276 A1 * | 6/2003 | Riddle | 709/230 |
| 2003/0112764 A1 * | 6/2003 | Gaspard et al. | 370/252 |
| 2004/0028009 A1 * | 2/2004 | Dorenbosch et al. | 370/329 |
| 2005/0213563 A1 * | 9/2005 | Shaffer et al. | 370/352 |
| 2007/0263553 A1 * | 11/2007 | Bharali et al. | 370/254 |
| 2012/0087312 A1 * | 4/2012 | Laroia et al. | 370/328 |

* cited by examiner

*Primary Examiner* — Kibrom T Hailu
*Assistant Examiner* — Zewdu A Beyen
(74) *Attorney, Agent, or Firm* — Tucker Ellis LLP

(57) ABSTRACT

In an example embodiment described herein, there is disclosed an implementation for analyzing a network having cache advance (CA) segments, such as a session control protocol (SCTP) pipe. The path between endpoints, e.g. a client on a first local area network (LAN) and a server on a second LAN, wherein the first and second LAN are coupled by an SCTP pipe, is determined and properties of the path are acquired.

12 Claims, 3 Drawing Sheets

ANALYZING A NETWORK WITH A CACHE ADVANCE PROXY

CROSS REFERENCE TO RELATED APPLICATIONS

This application is a continuation of U.S. patent application Ser. No. 11/771,246 that was filed on Jun. 29, 2007 now U.S. Pat. No. 8,295,277.

TECHNICAL FIELD

This application generally relates to data communication analysis.

BACKGROUND

WAN (Wide Area Network) optimization has become increasingly important in today's industry. Currently, Cache Advance (CA) transport optimization involves intercepting the transport protocol packets, such as currently transport control protocol (TCP) and user (or universal) datagram protocol UDP, and bundling the transport packets over one or many SCTP (stream control transport protocol) pipes, destined to the same branch office, but belonging to different sessions.

DESCRIPTION OF EXAMPLE EMBODIMENTS

The following presents a simplified summary of the example embodiments in order to provide a basic understanding of some aspects of the example embodiments. This summary is not an extensive overview of the example embodiments. It is intended to neither identify key or critical elements of the invention nor delineate the scope of the invention. Its sole purpose is to present some concepts of the example embodiments in a simplified form as a prelude to the more detailed description that is presented later.

In accordance with an example embodiment, there is disclosed herein an apparatus comprising a communications interface coupled to a network and control logic operable to control the operation of the communications interface. The control logic is configured to analyze a communication session with an endpoint disposed on the network. The control logic is configured to analyze the communication session by sending a predefined packet to the endpoint through the communications interface, and to receive responses to the predefined packet, the responses including an address and a service parameter.

In accordance with an example embodiment, there is disclosed herein an apparatus comprising a first communications port, a second communications port and router control logic coupled to the first and second communication ports and operable to route packets between the first and second communication ports. The router control logic is configured to intercept a predefined packet, the predefined packet comprising a response address. The router control logic is configured to send a response to the response address, the response comprising an address associated with the first communications port and a service parameter. The router control logic is configured to forward the predefined packet for transmission on the second communications port.

In accordance with an example embodiment, disclosed herein is a method comprising establishing a communication session between a first endpoint coupled to a first local area network and a second endpoint coupled to a second local area network, where the first and second networks are coupled by a session control transmission protocol (SCTP) pipe, verifying a route between the first endpoint and the second endpoint, determining a service parameter selected from a group consisting of file descriptor, latency, reserved bandwidth, and bandwidth utilization for the SCTP pipe and sending data representative of the route and data representative of the service parameter to the first endpoint.

BRIEF DESCRIPTION OF THE DRAWINGS

The accompanying drawings incorporated herein and forming a part of the specification, illustrate examples of the present invention, and together with the description serve to explain the principles of the invention.

OVERVIEW OF EXAMPLE EMBODIMENTS

Figure 1:
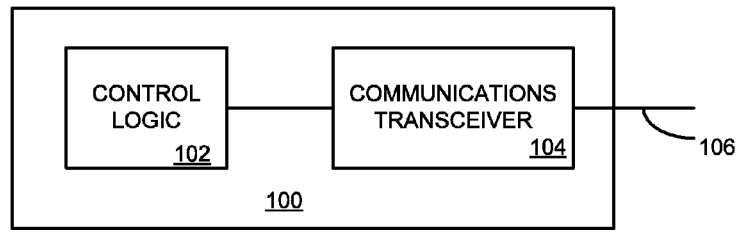
FIG. 1 is a block diagram illustrating an example of an endpoint configured in accordance with an example embodiment.

This description provides examples not intended to limit the scope of the invention, as claimed. The figures generally indicate the features of the examples, where it is understood and appreciated that like reference numerals are used to refer to like elements.

In an example embodiment described herein, there is disclosed an implementation for analyzing a network having cache advance (CA) segments. The path between endpoints (e.g. a client and a server) can be determined and properties of the path can be acquired.

For example, a network operator can configure an SCTP pipe and the policies to be applied for the TCP connections to the pipe. A test packet is sent between two endpoints enabling a network operator to determine whether the correct polices are being applied and the packet follows the correct route (e.g. SCTP pipe). This can facilitate debugging of the network such as by detecting mismatched policies and unbalanced loads. Statistics for the path can also be acquired and used for analysis. For example, by observing the packets entering & exiting a pipe, it can be determined whether some unknown packets are applying configured policies.

In an example embodiment, a diagnostic utility (Client) sets the router alert bit in the IP options and establishes a TCP connection to the desired destination. The router alert bit provides a mechanism whereby routers can intercept packets not addressed to them directly, without incurring any significant performance penalty. Routers that recognize the bit will examine the packets more closely to determine whether further processing is necessary. Routers that do not recognize the bit will ignore the packet.

Before the connection request is sent, the utility starts listening for UDP packets on a predetermined, high port (e.g. a port selected by the diagnostic utility). For example, the diagnostic utility may use one of ports 49,152 through 65,535 which are ephemeral ports and are used as temporary ports primarily by clients when communicating to servers. The predetermined port is sent in the TCP data portion of the SYN packet. The destination is on the other side of the network across the SCTP pipe. On seeing the TCP packet from the endpoint, an interception occurs on the entry node of the SCTP pipe, for example as any usual TCP packet is intercepted. The packet takes the same path as any other TCP packet and provides appropriate debugging information such as pipe details, policies applied, local statistics information etc.

All intermediate routers/nodes between the Client and entry node of the SCTP pipe are identified by sending a TCP SYN segment, with the option in the TCP header set, with a kind value of 24. The TCP SYN segments are sent from the diagnostic utility at the client utility in the order of increasing TTL values, to find all the intermediate routers/nodes between the Client and the Entry Node.

In particular embodiments, intermediate routers/nodes between the Entry Node and Exit Node of the pipe are identified by sending UDP segments with increasing TTL values to exit node, until the exit node is reached. Once exit node is reached it sends a special, predefined SCTP control message to the entry node with the destination details. Because the SCTP pipe may be leased from a third party carrier, intermediate routers/nodes between the entry node and exit may not respond; however, a response will still be obtained from the exit node.

Intermediate routers/nodes between exit node and Server are identified. Once the exit node receives the special, predefined SCTP control message, the exit node keeps sending TCP segments with increasing TTL values to the Server. Once the exit node determines the hops, it sends all the details of the intermediate routers/nodes between the exit node and Server, as a SCTP control response message.

In an example embodiment, the entry node collates the SCTP control response message with earlier acquired information. The entry node sends the information to the diagnostic utility.

FIG. 1 illustrates an example of a device 100 configured in accordance with an example embodiment. Device 100 is suitable for use as an endpoint (e.g. client) in a cache advance network. Device 100 comprises a communications interface coupled to a network. The communications interface comprises a communications transceiver 104 and a link 106. Communications transceiver 104 is suitably any transceiver capable of wired and/or wireless communications. Link 106 is appropriate for the type of communications transceiver 104. For example, if communications transceiver 104 is a wired transceiver, link 104 would comprise an appropriate interface cable; or if wireless transceiver 104 is a wireless transceiver, link 104 would comprise an antenna suitable for sending and receiving wireless signals.

Control logic 102 is operable to control the operation of the communications interface. Control logic 102 suitably comprises logic capable of performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Control logic 102 is configured to analyze a cache advance (CA) network as will be described herein.

In an example embodiment, control logic 102 is configured to analyze a communication session with an endpoint (e.g. a server; not shown) disposed on the network coupled to link 106. Control logic 102 is configured to analyze the communication session by sending a predefined packet to the endpoint through the communications interface and receive responses to the predefined packet, the responses including an address and a service parameter.

As used herein, a service parameter is data that described any property of the link between device 100 and the endpoint. For example, the service parameter may include a file descriptor for a stream control transport protocol (SCTP) pipe coupling device 100 to the server. The service parameter may include the allocated bandwidth for the SCTP pipe and/or current bandwidth utilization. In an example embodiment, the service parameter includes SCTP pipe latency.

The network coupling device 100 to the server may comprise a plurality of segments, which may include at least one cache advance segment. For example, as will be described in more detail in FIG. 3 herein, the network may comprises a first local area network (LAN) coupled to the communications interface, a stream control transport protocol (SCTP) pipe coupled to the first LAN, and a second LAN coupling the SCTP pipe to the endpoint.

In an example embodiment, control logic 102 is responsive to receive responses to the predefined packet on a predefined port associated with communications transceiver 104. An address for the predefined port is included in the predefined packet. This will allow routers/nodes intercepting the packet to determine where to send responses to the packet. In an example embodiment, the redefined packet is a transmission control protocol (TCP) packet comprising a header. The predefined packet may also comprise a router alert bit, the router alert bit is set to a predefined setting for acquiring responses to the predefined packet. In particular embodiments, the header comprises a predetermined value for a TCP option, for example the predetermined TCP option value can be set to 24.

In an example embodiment, control logic 102 is configured to begin listening for user datagram protocol (UDP) packets on a predetermined port before sending the predefined packet. Moreover, control logic 102 can be configured to establish a transmission control protocol (TCP) session with the endpoint before sending the predefined packet.

In operation, control logic 102 establishes a communication session (for example a TCP session) with an endpoint (e.g. a server) disposed on a network coupled to link 106. The network can be a cache advance network with at least one SCTP pipe between device 100 and the server. Control logic 102 selects a port to receive UDP datagrams for analyzing the session with the server. Control logic 102 generates a special packet for analyzing the session. The packet includes a router alert bit that will alert routers in the path between device 100 and the server to examine the packet to determine whether the router should perform further processing. The packet also includes the address for communications transceiver 104 and the port selected for receiving UDP datagrams in response to the special packet.

In an example embodiment, the special packet contains data that requests a router intercepting the packet to send data to the selected port. For example, the data may request the router send its address and a service parameter, such as a file descriptor for the session, bandwidth for the SCTP pipe and/or current bandwidth utilization, latency, etc.

In particular embodiments, control logic 102 sends a TCP SYN segment with the option in the TCP header set to a predetermined kind value (e.g. 24) to identify routers between device 100 and the entry node of the SCTP pipe. The TCP SYN packets are sent in the order of increasing TTL (time to live) values. A router receiving a TCP SYN packet with a TTL value of 0 will send a message back to device 100 informing it the packet was undeliverable. This will allow control logic 102 to determine the route the packet takes between device 100 and the entry node of the SCTP pipe. In an example embodiment, the entry node of the SCTP pipe can be configured to continue propagating the TCP SYN packets until eventually the endpoint (server) is reached. In another example embodiment, once a TCP SYN packet reaches the SCTP entry node, control logic 102 can have a special predefined packet sent to the SCTP entry node to acquire data from the SCTP entry node and/or to request the entry node to continue determining the route to the server.

Figure 2:
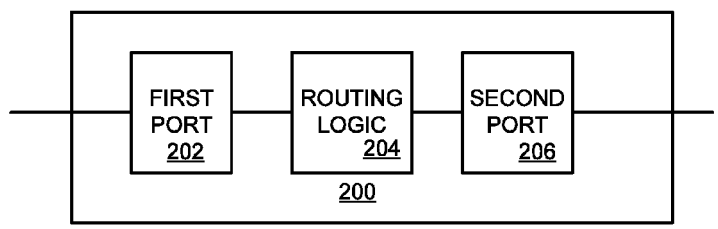
FIG. 2 is a block diagram of a router configured in accordance with an example embodiment.

Referring to FIG. 2, there is illustrated an example of a router 200 configured in accordance with an example embodiment. Router 200 comprises a first port 202 and a second port 206 coupled by routing logic 204. First port 202 and second port 206 may be physical ports, logical ports, or both. Routing logic 204 is configured to route packets between first port 202 and second port 206.

In an example embodiment, first port 202 is coupled to a local area network, while second port 206 is coupled to a SCTP pipe. Depending on the direction of the packet, second port 206 can be either the entry node (for packets received from the LAN and directed to the SCTP pipe) or the exit node (for packets received from the SCTP pipe destined to a node on the LAN). In particular embodiments, routing control logic 204 will group a plurality of TCP streams into a single SCTP stream.

In an example embodiment, router control logic 204 is configured to intercept a predefined packet received on first communications port 202. The predefined packet comprises a response address. Router control logic 204 is configured to send a response for the predefined packet to the response address. The response comprises an address associated with first communications port 202 and a service parameter. Router control logic 204 is configured to forward the predefined packet for transmission on second communications port 206.

The interception of the special, predefined packet occurs the same way as any usual TCP packet is intercepted. The packet takes the same path as any other TCP packet and is sent to the entry/exit routers of the SCTP pipe servicing the TCP stream. Router control logic 204 looks at the router alert bit. If the router alert bit is set, then a UDP packet with the details of the router/node is sent to the requesting node using the UDP destination port specified in the data part of the special, predefined packet (e.g. the data part of a SYN packet). The UDP packet would contain details including, but not limited to, the local file descriptor (fd), local SCTP pipe allocated for transporting the TCP segment, the stream in the SCTP pipe chosen to transport the TCP segment, bandwidth allocated for the stream, bandwidth used by the stream, latency, etc.

In an example embodiment, first port 202 is coupled to a transmission control protocol (TCP) session and the second port 206 is coupled to a session control transport protocol (SCTP) pipe. Routing control logic 204 is configured to include data representative of the identity of the SCTP pipe in the response to the special predefined pipe.

In an example embodiment, where second port 206 is an entry node into an SCTP pipe, routing control logic 204 is configured to send a predetermined message to the exit node of the SCTP pipe (not shown, see e.g. FIG. 3) and wait for a response to the predetermined message to determine latency of the SCTP pipe. Router control logic 2-4 is further configured to include data representative of latency of the SCTP pipe in the response.

In particular embodiments, router control logic 204 is configured to include data representative of reserved bandwidth and/or data representative of current bandwidth utilization of the SCTP pipe in the response. If router 200 is at the entry node of the SCTP pipe, router control logic 204 can be configured to collate responses to the predefined packet received on second port 206 with its response to the special predefined packet prior to sending the response.

Figure 3:
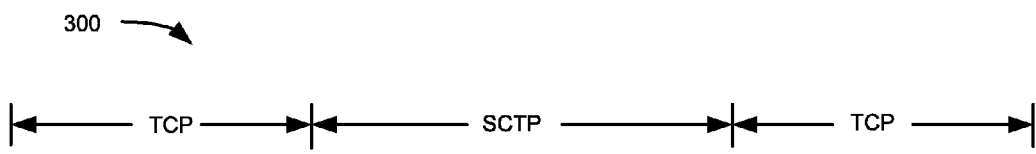
FIG. 3 is a block diagram of a network suitably adapted for implementing an example embodiment.
Figure 3:
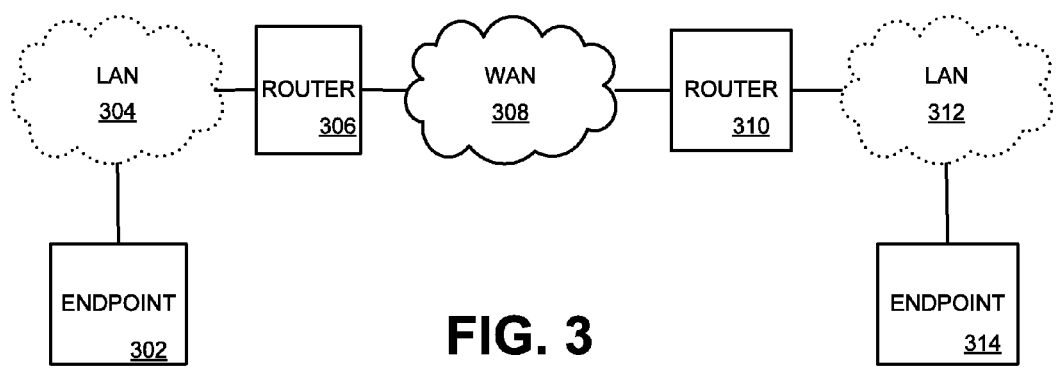

FIG. 3 illustrates an example embodiment of a network 300. Network 300 comprises an endpoint 302 (for example device 100 in FIG. 1 or a client), a local area network (LAN) 304 coupled to a router 306. Router 306 is coupled to Wide Area Network (WAN) 308. Router 310 couples WAN 308 to LAN 312. Endpoint 314 (e.g. a server) is disposed on LAN 312. Routers 306, 310 may be configured like router 200 as described in FIG. 2.

In the example illustrated in FIG. 3, a transport layer (Layer 4) session between endpoint 302 (e.g. client) and endpoint 314 (e.g. a server) comprises a TCP session from endpoint 302 to router 306, a SCTP pipe between router 306 and router 310 and a TCP connection between router 310 and endpoint 314 (e.g. server). When the session is established, a TCP connection is setup between endpoint/client 302 and router 306, a SCTP pipe, which may suitably comprise a plurality of TCP sessions, between router 306 (also referred to as the entry node in this example) and router 310 (also referred to as the exit node in this example). Router 310 then establishes a TCP session between router 310 and endpoint/server 314.

In an example embodiment, a diagnostic utility can be implemented in client/endpoint 302 to verify the connection between client/endpoint 302 and server/endpoint 314. Client/endpoint 302 selects a UDP port and begins listening on the selected UDP port. The UDP port can be any available port. For example, a 'high' UDP port, such as one of ports 49,152 through 65,535 which are ephemeral ports and are used as temporary ports primarily by clients when communicating to servers can be selected.

Client/endpoint 302 sends out a special, predefined packet to server/endpoint 314 that routers between endpoints 302, 314, such as routers 306, 310 are configured to intercept the predefined packet and respond accordingly. The packet may also contain data requesting the router respond with policies applied to the packet. The routers may also respond with statistics for the session, for example the file descriptor of the TCP/SCTP session, bandwidth allocation, bandwidth utilization, speed and/or latency. The responses are sent to the selected UDP port at client/endpoint 302.

Upon arrival of the packet at router 306 (the SCTP pipe entry node in this example), router 306 may convert the packet to a special SCTP packet and send the special SCTP packet to router 310 (the SCTP exit node in this example). Router 310 is configured to be responsive to the special SCTP packet to send its address along with policies and/or statistics for the SCTP session. For example, router 310 may send a list of TCP/UDP sessions contained in the SCTP pipe. This would allow debugging of the SCTP pipe to determine if unknown sessions or processes are using the SCTP pipe. In addition, router 310 would send a predefined, special packet on LAN 312 to ascertain any routers between router 310 and server/endpoint 314. Data may either be sent by each router back to the selected port at client/endpoint 302, or may be sent to router 310 where it is collated and sent to router 306, which collates data received from router 310 with its own data and sends the data to the selected UDP port at client/endpoint 302.

In an example embodiment, the special, predefined packet may be sent with increasing TTL values. For example, when a router/node receives a packet with a TTL value of 0, the router/node responds with a message undeliverable message to the source port in the packet, This can allow a diagnostic utility in client/endpoint 302 to acquire a hop by hop sequencing of the session and allow it to compute round trip packet time, enabling it to calculate latency. Packets arriving at the entry point of the SCTP pipe (e.g. router 306) may be converted to pass through the SCTP pipe. Because the SCTP pipe may be leased from a third party, the details within the pipe may not be available unless the third party allows the information to be gathered. However, data may still be gathered from the SCTP exit node (e.g. router 310 in this example), thus enabling data to be acquired about data entering the SCTP pipe and exiting the SCTP pipe. The exit node, responsive to the special SCTP packet, can send packets with increasing TTL values until it reaches server/endpoint 314.

Figure 4:
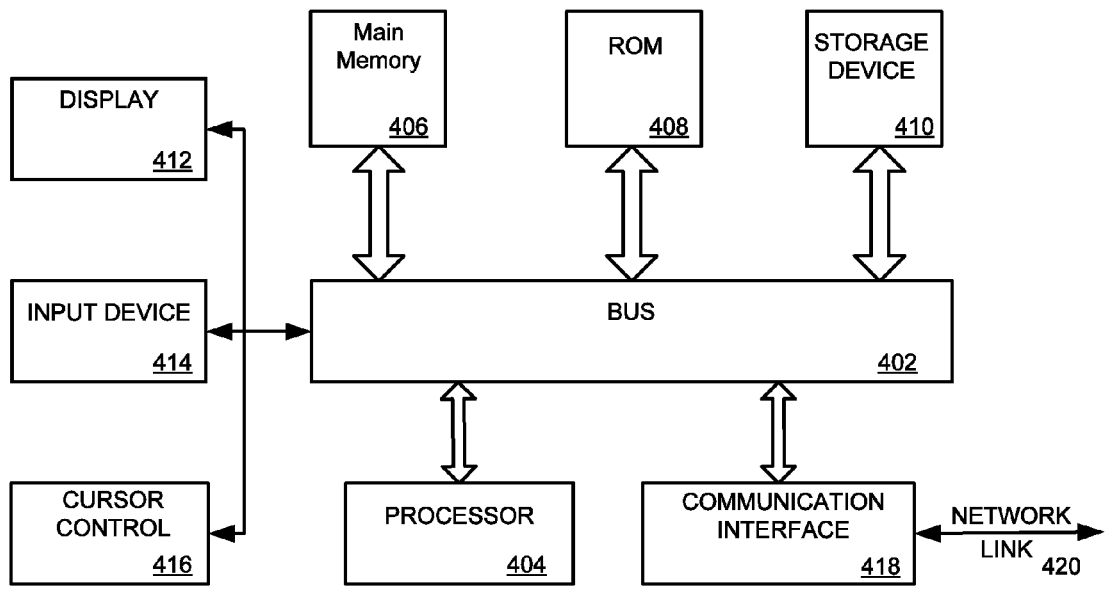
FIG. 4 is a block diagram of a computer system upon which an example embodiment can be implemented.

FIG. 4 is a block diagram that illustrates a computer system 400 upon which an embodiment of the invention may be implemented. For example computer system 400 is suitable for implementing control logic 102 (FIG. 1), router control logic 204 (FIG. 2) or for performing the functionality of endpoints 302, 314 (FIG. 3) or routers 306, 310 (FIG. 3). Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 such as a cathode ray tube (CRT) or liquid crystal display (LCD), for displaying information to a computer user. An input device 414, such as a keyboard including alphanumeric and other keys is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g. x) and a second axis (e.g. y) that allows the device to specify positions in a plane.

An aspect of the invention is related to the use of computer system 400 for analyzing a network with a cache advance proxy. According to one embodiment of the invention, analyzing a network with a cache advance proxy is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a network (not shown), such as a local area network or wide area network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Computer system 400 can send messages and receive data, including program codes, through the network(s), network link 420, and communication interface 418. In an example embodiment, a server coupled to the network associated with network link 420 might transmit a requested code for an application program through communication interface 418. In accordance with the invention, one such downloaded application provides for analyzing a network with a cache advance proxy as described herein.

The received code may be executed by processor 404 as it is received, and/or stored in storage device 410, or other non-volatile storage for later execution. In this manner, computer system 400 may obtain application code in the form of a carrier wave.

Figure 5:
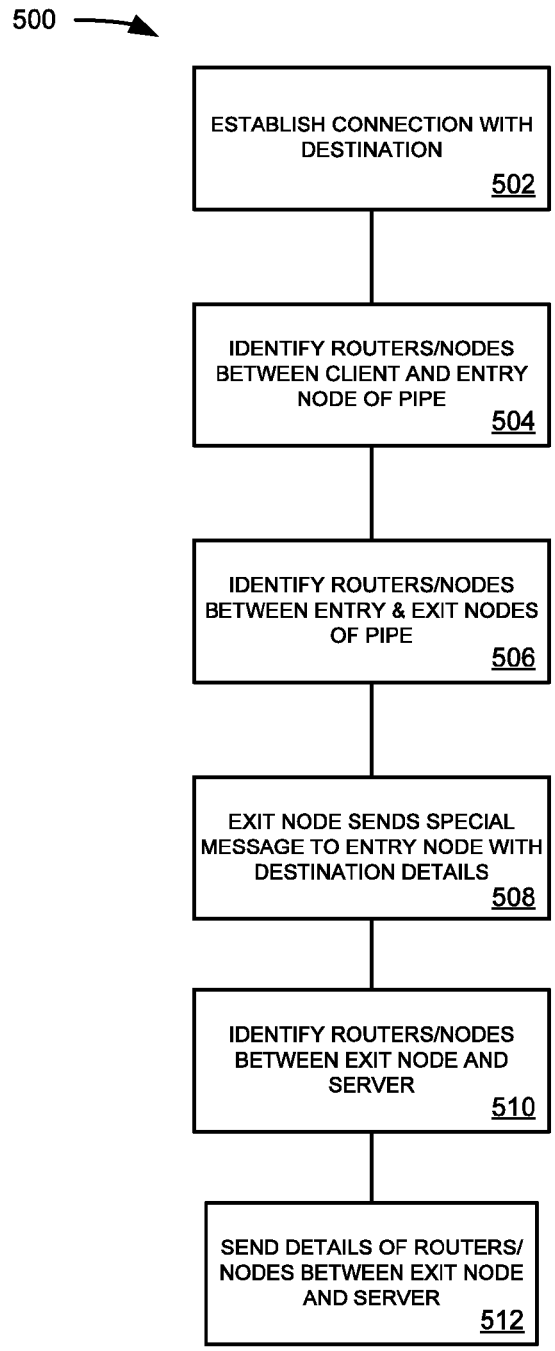
FIG. 5 is a block diagram of a methodology in accordance with an example embodiment.

In view of the foregoing structural and functional features described above, a methodology in accordance with an example embodiment will be better appreciated with reference to FIG. 5. While, for purposes of simplicity of explanation, the methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. Example methodologies described herein are suitably adapted to be implemented in hardware, software, or a combination thereof.

At 502, a connection is established between a first endpoint (e.g. a client) with a desired destination (e.g. a server). A port (e.g. a 'high' port or a high UDP port) is selected for receiving responses to a special packet sent to analyze the connection. The special packet may be sent with the request to establish the connection, or may be sent after the connection has been established. The client may start listening on the selected port before or concurrently with establishing the connection. In an example embodiment, the connection is a TCP connection. In the example embodiment, the selected UDP port is identified in the TCP data portion of a SYN (synchronize) packet.

In an example embodiment, the destination is across a SCTP pipe. Upon receiving a TCP packet from the client, the entry node into the SCTP gateway intercepts the packet as it would any other TCP packet. Because the router alert bit is sent, the entry node examines the packet further and provides the appropriate information such as pipe details, policies applied, location statistical information, etc. For example, the entry node may provide the client the identification (e.g. a file descriptor) for the pipe the packet will be passing through, bandwidth allocated for the pipe, available bandwidth for the pipe, latency, etc.

At 504, intermediate routers/nodes between the client and the entry node are identified. In an example embodiment, the routers/nodes are identified by sending a TCP SYN segment with the option in the TCP header set with a "predetermined kind" value (e.g. 24). The client sends the TCP segments in order of increasing TTL values to discover the intermediate routers/nodes between the client and the entry node.

At 506, intermediate routers/nodes between the entry and exit nodes of the SCTP pipe are identified. In some embodiments, this data may not be available. For example, in embodiments where the SCTP pipe is leased from a third party, the third party may configure their routers not to respond. In an example embodiment, the entry node sends UDP segments with increasing TTL values to the exit node, until the exit node is reached. At 508, the exit node is responsive to receiving the UDP segment to send a special control message to the entry node with the destination details.

At 510, intermediate nodes between the exit node and the destination (server) are identified. For example, the exit node can be configured to be responsive to a special SCTP control message to acquire this data. For example, the exit node may send TCP segments with increasing TTL values until reaching the Server. Once the exit node determines the hops, at 512 the exit node sends the details of the intermediate routers/nodes between the exit node and the server in a special SCTP control message. In particular embodiments, the exit node sends the details to the entry node, which collates the data and sends the data to the client. In other particular embodiments, the exit node sends the details to the clients (e.g. via a unicast message routed through the SCTP pipe which is forwarded by the entry node).

Although the systems and methods described herein are described employing TCP and SCTP, this is merely illustrative and should not be construed as limiting. Aspects of the example embodiments described herein are suitably adaptable to any protocol.

The invention claimed is:

1. An apparatus, comprising:
a first communication port, wherein the first communication port is coupled with an exit of an associated stream control transport protocol (SCTP) pipe;
a second communication port, wherein the second communication port is coupled with an associated local area network employing transmission control protocol (TCP) packets for communications; and
router control logic coupled with the first and second communication ports and operable to route packets between the first and second communication ports;
wherein the router control logic intercepts a first SCTP control packet requesting router information sent by an entry node of the associated SCTP pipe, the first SCTP control packet comprising a source address for responding on the first communication port and a destination address corresponding to an endpoint;
wherein the router control logic converts, in response to receiving the first SCTP control packet, the first SCTP control packet to a predefined packet and sends the predefined packet for requesting router information on the second communication port, the requested router information comprising transmission control protocol (TCP) information and User Datagram Protocol (UDP) session information;
wherein the router control logic receives responses to the predefined packet on the second communication port, wherein the responses to the predefined packet comprise routing data;
wherein the routing data comprises data representative of routers discovered between the second communication port and the endpoint;
wherein the router control logic collates the responses to the predefined packet received on the second communication port;
wherein the router control logic sends a second SCTP control packet to the entry node of the associated SCTP pipe in response to receiving the first SCTP control packet via the first communication port, the second SCTP control packet comprising the collated responses to the predefined packet received via the second communication port; and
wherein the second SCTP control packet further comprises data representative of routers discovered between the second communication port and the endpoint, and a list of TCP and UDP sessions in the associated SCTP pipe.

2. An apparatus according to claim 1, wherein the router control logic is configured to include data representative of the identity of the associated SCTP pipe in the response to the first SCTP control packet.

3. The apparatus according to claim 1, wherein the predefined packet is a Uniform Datagram Protocol (UDP) packet;
the router control logic sends a sequence of UDP packets with a time to live (TTL) value until reaching the endpoint; and
wherein the TTL value increases by one for each UDP packet in the sequence.

4. The apparatus according to claim 1, wherein the predefined packet is a TCP packet; the router control logic sends a sequence of TCP packets with a time to live (TTL) value until reaching the endpoint; and wherein the TTL value increases by one for each TCP packet in the sequence.

5. Logic encoded in a non-transitory, tangible computer readable medium for execution by a processor, and when executed operable to:

intercept a first stream transmission protocol (SCTP) control packet received from a first communication port coupled with an associated SCTP pipe, the first SCTP control packet requesting router information sent by an entry node of the associated SCTP pipe, the first SCTP control packet comprising a source address for responding on the first communication port and a destination address corresponding to an endpoint;

convert, in response to receiving the first SCTP control packet, the first control SCTP packet to a predefined packet and send the predefined packet for requesting router information on a second communication port coupled with an associated local area network coupled with the endpoint, the associated local area network employing a transmission control protocol (TCP) for communications, the requested router information comprising transmission control protocol (TCP) information and User Datagram Protocol (UDP) session information;

receive responses to the predefined packet on the second communication port, wherein the responses to the predefined packet comprise routing data;

wherein the routing data comprises data representative of routers discovered between the second communication port and the endpoint;

collate the responses to the predefined packet received on the second communication port;

send a second SCTP control packet to the entry node of the associated SCTP pipe in response to receiving the first SCTP control packet via the first communication port, the second SCTP control packet comprising the collated responses to the predefined packet received via the second communication port; and wherein the second SCTP control packet further comprises data representative of routers discovered between the second communication port and the endpoint, and a list of TCP and UDP sessions in the associated SCTP pipe.

6. The logic set forth in claim 5, wherein the second SCTP control packet includes data representative of the identity of the associated SCTP pipe.

7. The logic set forth in claim 5, wherein the predefined packet is a Uniform Datagram Protocol (UDP) packet, the logic is further operable to:

send a sequence of UDP packets with a time to live (TTL) value until reaching the endpoint; and wherein the TTL value increases by one for each UDP packet in the sequence.

8. The logic set forth in claim 5, wherein the predefined packet is a TCP packet, the logic is further operable to:

send a sequence of TCP packets with a time to live (TTL) value until reaching the endpoint; and wherein the TTL value increases by one for each TCP packet in the sequence.

9. A method, comprising:

intercepting, by an exit node of an associated SCTP pipe, a first stream transmission protocol (SCTP) control packet received from a first communication port coupled with the associated SCTP pipe, the first SCTP control packet requesting router information sent by an entry node of the associated SCTP pipe, the first SCTP control packet comprising a source address for responding, on the first communication port and a destination address corresponding to an endpoint;

converting, by an exit node of the associated SCTP pipe, in response to receiving the first SCTP control packet, the first SCTP control packet to a predefined packet and sending the predefined packet for requesting router information on the second communication port coupled with an associated local area network coupled with the endpoint, the associated local area network employing a transmission control protocol (TCP) for communications, the requested router information comprising transmission control protocol (TCP) information and User Datagram Protocol (UDP) session information;

receiving responses to the predefined packet on the second communication port, wherein the responses to the predefined packet comprise routing data;

wherein the routing data comprises data representative of routers discovered between the second communication port and the endpoint;

collating, by an exit node of the associated SCTP pipe, the responses to the predefined packet received on the second communication port;

sending a second SCTP control packet to the entry node of the associated SCTP pipe in response to receiving the first SCTP control packet via the first communication port, the second SCTP control packet comprising the collated responses to the predefined packet received via the second communication port; and wherein the second SCTP control packet further comprises data representative of routers discovered between the second communication port and the endpoint, and a list of TCP and UDP sessions in the associated SCTP pipe.

10. The method according to claim 9, wherein the second SCTP control packet includes data representative of the identity of the associated SCTP pipe.

11. The method according to claim 9, wherein the predefined packet is a Uniform Datagram Protocol (UDP) packet, the sending a predefined packet comprises:

sending a sequence of UDP packets with a time to live (TTL) value until reaching the endpoint; and wherein the TTL value increases by one for each UDP packet in the sequence.

12. The method according to claim 9, wherein the predefined packet is a TCP packet, the sending a predefined packet comprises:

sending a sequence of TCP packets with a time to live (TTL) value until reaching the endpoint; and wherein the TTL value increases by one for each TCP packet in the sequence.

* * * * *